(12) United States Patent
Levkovitz et al.

(10) Patent No.: US 11,630,960 B2
(45) Date of Patent: Apr. 18, 2023

(54) SELF ADAPTIVE SCANNING

(71) Applicant: Antitoxin Technologies Inc., Palo Alto, CA (US)

(72) Inventors: Zohar Levkovitz, Palo Alto, CA (US); Ron Porat, Tel-Mond (IL); Hemi Pecker, Haifa (IL); Yaakov Schwartzman, Petach Tikva (IL); Hezi Stern, Even-Yehuda (IL); Alon Gur, Tel Aviv (IL); Arik Cohen, Jerusalem (IL)

(73) Assignee: Antitoxin Technologies Inc., Palo Alto, CA (US)

(*) Notice: Subject to any disclaimer, the term of this patent is extended or adjusted under 35 U.S.C. 154(b) by 492 days.

(21) Appl. No.: 16/840,491

(22) Filed: Apr. 6, 2020

(65) Prior Publication Data

US 2021/0312140 A1 Oct. 7, 2021

(51) Int. Cl.
| | |
|---|---|
| *G06F 16/75* | (2019.01) |
| *G06F 40/35* | (2020.01) |
| *G06K 9/62* | (2022.01) |
| *G06F 40/216* | (2020.01) |
| *G06F 16/906* | (2019.01) |
| *G06F 16/45* | (2019.01) |
| *H04L 51/52* | (2022.01) |

(52) U.S. Cl.
CPC ............ *G06F 40/35* (2020.01); *G06F 16/45* (2019.01); *G06F 16/75* (2019.01); *G06F 16/906* (2019.01); *G06F 40/216* (2020.01); *G06K 9/6221* (2013.01); *H04L 51/52* (2022.05)

(58) Field of Classification Search
CPC ......... G06F 16/45; G06F 16/906; G06F 16/75
See application file for complete search history.

(56) References Cited

U.S. PATENT DOCUMENTS

2020/0160198 A1* 5/2020 Reeves ............... G06F 3/011

* cited by examiner

*Primary Examiner* — Baoquoc N To (57) ABSTRACT

A method for classifying a digital asset, comprising: retrieving from a repository, according to an initial identifier, a digital asset; computing at least one asset score, each indicative of a degree of confidence that the digital asset has a respective offense classification selected from a plurality of offense classifications; subject to the at least one asset score being less than at least one threshold score: adding to a list of identifiers at least one identifier extracted from the digital asset; and in each of at least one iteration: retrieving from the repository at least one other digital asset, according to at least one selected identifier selected from the list of identifiers; computing a plurality of other asset scores, each associated with one other digital asset of the at least one other digital asset and indicative of another degree of confidence that the other digital asset has another respective offense classification.

29 Claims, 6 Drawing Sheets

SELF ADAPTIVE SCANNING

FIELD AND BACKGROUND OF THE INVENTION

Some embodiments described in the present disclosure relate to processing digital data and, more specifically, but not exclusively, to processing digital data for the purpose of identifying offensive digital data.

These days there is an increasing use of digital technologies for data sharing and for social interaction. Such digital technologies encompass a wide range of areas including digital communication networks, social network services, for example Facebook, Instagram, Snapchat, and Twitter, messaging services, for example WhatsApp, gaming platforms, for example Fortnite, online communities (forums), blogs, and file sharing, for example via a website. Some digital technologies facilitate sharing, distributing and exchanging digital content, for example digital images, digital video and digital audio. Some digital technologies facilitate exchanging text messages.

As use of digital technologies has increased, so has increased offensive use of digital technologies. Digital technologies are known to be used to perpetrate socially unacceptable, and occasionally illegal, behavior, for example racism, offering an illegal substance such as alcohol or an identified drug, offering gambling, solicitation, pornography and pedophilia. Messaging services, whether on their own or accompanying another service such as a game, are known to be used by some people to make other people feel angry, sad, or scared.

Digital-technology-enabled social interactions involving children are also increasing in prevalence. For example, some children interact with their peers using social media platforms, for example WhatsApp groups. Other examples of social interactions involving children include a child playing network connected games, for example Fortnite, a child accessing an online community, and a child browsing one or more websites on the Internet. As a result, there is an increase in an amount of children adversely effected by social interactions, for example by being bullied using digital technologies, or by having an interaction with a sexual predator via digital technologies. In addition, some children use digital technology to share an intention to inflict self-harm or to confess substance abuse, for example in a chat group or on a social media personal page.

Offensive content may be illegal. In addition, there is an increasing amount of evidence linking exposure of a child to offending social interactions to an increase in a likelihood of the child to engage in self-harm, an increase in a likelihood of the child to attempt to commit suicide, and an increase in long term effects including a likelihood of the child to engage in substance abuse, a likelihood of the child to commit non-violent crime, reduced physical safety of the child at school, and a reduction in the child's motivation to apply themselves to school work and extracurricular activity.

There is a need to identify offensive content and offending social interactions on digital-technology-based platforms.

SUMMARY OF THE INVENTION

It is an object of the present disclosure to describe a system and a method for classifying a digital asset.

The foregoing and other objects are achieved by the features of the independent claims. Further implementation forms are apparent from the dependent claims, the description and the figures.

According to a first aspect of the invention, a method for classifying a digital asset comprises: retrieving from at least one repository, according to an initial identifier, a digital asset; computing at least one asset score, each indicative of a degree of confidence that the digital asset has a respective offense classification selected from a plurality of offense classifications; subject to the at least one asset score being less than at least one threshold score: adding to a list of identifiers at least one identifier extracted from the digital asset; and in each of at least one iteration: retrieving from the at least one repository at least one other digital asset, according to at least one selected identifier selected from the list of identifiers; computing a plurality of other asset scores, each associated with one other digital asset of the at least one other digital asset and indicative of another degree of confidence that the other digital asset has another respective offense classification; updating the at least one asset score according to the plurality of other asset scores and at least one policy; and determining the digital asset is offensive subject to at least one of the at least one asset score exceeding the at least one threshold score, otherwise adding to the list of identifiers at least one other identifier extracted from the at least one other digital asset; and subject to determining the digital asset is offensive, providing the determination to at least one software object for the purpose of performing at least one administrative task.

According to a second aspect of the invention, a system for classifying a digital asset comprises at least one hardware processor adapted for: retrieving from at least one repository, according to an initial identifier, a digital asset; computing at least one asset score, each indicative of a degree of confidence that the digital asset has a respective offense classification selected from a plurality of offense classifications; subject to the at least one asset score being less than at least one threshold score: adding to a list of identifiers at least one identifier extracted from the digital asset; and in each of at least one iteration: retrieving from the at least one repository at least one other digital asset, according to at least one selected identifier selected from the list of identifiers; computing a plurality of other asset scores, each associated with one other digital asset of the at least one other digital asset and indicative of another degree of confidence that the other digital asset has another respective offense classification; updating the at least one asset score according to the plurality of other asset scores and at least one policy; and determining the digital asset is offensive subject to at least one of the at least one asset score exceeding the at least one threshold score, otherwise adding to the list of identifiers at least one other identifier extracted from the at least one other digital asset; and subject to determining the digital asset is offensive, providing the determination to at least one software object for the purpose of performing at least one administrative task.

According to a third aspect of the invention, a system for managing digital content comprises at least one hardware processor adapter for, in each of a plurality of iterations: receiving a digital asset from at least one other hardware processor; adding the digital asset to at least one digital repository; computing at least one score for the digital asset, by: retrieving the digital asset from the at least one repository, according to an initial identifier; computing the at least one asset score, each indicative of a degree of confidence that the digital asset has a respective offense classification selected from a plurality of offense classifications; and subject to the at least one asset score being less than at least one threshold score: adding to a list of identifiers at least one identifier extracted from the digital asset; and in each of at least one iteration: retrieving from the at least one repository at least one other digital asset, according to at least one selected identifier selected from the list of identifiers; computing a plurality of other asset scores, each associated with one other digital asset of the at least one other digital asset and indicative of another degree of confidence that the other digital asset has another respective offense classification; updating the at least one asset score according to the plurality of other asset scores and at least one policy; and determining the digital asset is offensive subject to at least one of the at least one asset score exceeding the at least one threshold score, otherwise adding to the list of identifiers at least one other identifier extracted from the at least one other digital asset; and subject to determining the digital asset is offensive, providing the determination to at least one software object for the purpose of performing at least one administrative task.

With reference to the first and second aspects, in a first possible implementation of the first and second aspects of the present invention the initial identifier is selected from a group of asset identifiers consisting of: a Universal Resource Location (URL) value, a search term value, a file name value, a folder name value, a file offset value, and an object identifier indicative of an object in a digital asset. Optionally, the at least one identifier is selected from the group of asset identifiers.

With reference to the first and second aspects, in a second possible implementation of the first and second aspects of the present invention the digital asset is selected from a group of asset identifiers consisting of: a text file, a search term value, a folder, a digital image, a digital video, a frame extracted from a digital video, a digital audio file, an audio fragment extracted from a digital audio file, a text, an emoji, a location value, an object extracted from a file, and an action value indicative of an occurrence in an interaction in social media. Optionally, when the digital asset is a video file the at least one identifier comprises a list of frames extracted from the video file and the at least one selected identifier is selected from the list of identifiers according to a search algorithm applied to the list of frames.

Optionally, the search algorithm is a binary search algorithm applied using a plurality of offsets in the video file, each of one of the list of frames extracted from the video file. Using a search algorithm facilitates reducing cost of operation and additionally or alternatively increasing throughput by reducing an amount of time required to classify the digital asset and additionally or alternatively reducing an amount of computation resources required to classify the digital asset. Optionally, the method further comprises when the digital asset is an emoji converting the emoji into a corresponding text. Optionally, when the initial identifier is a search term value the digital asset comprises a plurality of URLs. Optionally, retrieving the digital asset from the at least one repository according to the initial identifier comprises providing the search term to at least one search engine. Classifying a digital asset comprising a plurality of URLs retrieved by providing a search term to at least one search engine increases usability of the method. Optionally, when the digital asset is a folder, the at least one identifier is indicative of a list of files in the folder. Optionally, when the digital asset is a digital audio file the at least one identifier comprises a list of fragments extracted from the digital audio file.

Optionally, the list of fragments comprises a plurality of fragments, each having a beginning and an end in accordance with a temporal location of the respective fragment in the digital audio file. Optionally, the plurality of fragments are identified by: adding to the list of fragments a first fragment extracted from the digital audio file, associated with at least one overlap direction comprising overlap head and overlap tail; and in each of a plurality of extraction iterations: selecting a fragment from the list of fragments; extracting from the digital audio file an extension fragment such that the fragment and extension fragment are contiguous in the digital audio file according to an overlap direction of the at least one overlap direction associated thereto; appending the extension fragment to a part of the fragment, selected according to the overlap direction, to produce a new fragment; associating the new fragment with the overlap direction; and adding the new fragment to the list of fragments.

Optionally, when the overlap direction is overlap tail the part of the fragment is from the end of the fragment and the extension fragment immediately follows the fragment in the digital audio file. Optionally, when the overlap direction is overlap head the part of the fragment is from the beginning of the fragment and the extension fragment immediately precedes the fragment in the digital audio file. Identifying additional fragments such that each fragment partially overlaps a previous fragment increases accuracy of a classification of the digital asset as each new fragment has a context of the overlapping part. Optionally, when the digital asset is a text the at least one identifier comprises a list of sentences extracted from the text. Optionally, the method further comprises when the digital asset is an action value or a location value associating the digital asset with at least one other digital asset. Associating a digital asset with at least one other digital asset increases accuracy of classification of the at least one other digital asset.

With reference to the first and second aspects, in a third possible implementation of the first and second aspects of the present invention retrieving the at least one other digital asset comprises extracting the at least one other digital asset from the digital asset according to the at least one selected identifier. Optionally, each of the list of identifiers is associated with a level value, indicative of a location in a hierarchical relationship between the list of identifiers.

Optionally, the at least one selected identifier is selected from the list of identifiers subject to the respective level value of the at least one selected identifier being less than a level threshold. Optionally, the at least one selected identifier is selected from the list of identifiers subject to failing to identify the at least one selected identifier in a list of recently analyzed identifiers, analyzed according to a recent policy. Optionally, the at least one identifier extracted from the digital asset are added to the list of identifiers according to at least one scope value. Optionally, at least one of the at least one scope value is selected from a group consisting of: all, random, and every. Limiting an amount of assets for which the plurality of other asset scores is computed facilitates reducing an amount of time and additionally or alternatively an amount of computing resources required to classify the digital asset compared to some other methods, thus increasing throughput of the system, and additionally or alternatively reducing cost if operation of the system. Selecting an identifier subject to failing to identify the identifier in a list of recently analyzed identifiers identified according to the recent policy facilitates reducing the amount of time and additionally or alternatively the amount of computing resources required to classify the digital asset by avoiding duplicate computation of a plurality of other asset scores for another digital asset retrieved according to the identifier. Avoiding selecting the identifier subject to the analysis being according to a recent policy facilitates improving accuracy of an output of the system by executing an analysis when there is a change in policy.

With reference to the first and second aspects, in a fourth possible implementation of the first and second aspects of the present invention computing the at least one asset score is subject to a result of applying to the digital asset at least one quality-assurance test. Optionally, computing the plurality of other asset scores is subject to another result of applying to the at least one other digital asset at least one other quality assurance test. Applying at least one quality-assurance test to the digital asset and additionally or alternatively applying at least one other quality assurance test to the at least one other digital asset improves throughput of the system by avoiding using computation time to analyze an invalid data asset, and additionally or alternatively reduces cost of operation of the system by reducing an amount of computation resources required to analyze the invalid data asset.

With reference to the first and second aspects, in a fifth possible implementation of the first and second aspects of the present invention computing the at least one score comprises executing at least one classification model, trained to compute, in response to input comprising an input digital asset, at least one offense classification and at least one score indicative of a degree of confidence the input digital asset has the at least one offense classification. Optionally, updating the at least one asset score comprises executing at least one other classification model, trained to compute, in response to input comprising at least one input digital asset and a plurality of input asset scores of an input digital asset, at least one additional score indicative of a degree of confidence the input digital asset has at least one offense classification. Using at least one classification model trained as described above, and additionally or alternatively at least one other classification model trained as described above increases accuracy of the at least one asset score, thus increasing accuracy of an output of the system.

With reference to the first and second aspects, in a sixth possible implementation of the first and second aspects of the present invention the at least one administrative task comprises comparing the determination to the at least one policy. Comparing the determination to the at least one policy increases usability of the system, allowing a system owner to adjust an outcome of the determination according to an owner policy.

With reference to the first and second aspects, in a seventh possible implementation of the first and second aspects of the present invention the method further comprises adding at least one identification value identifying the at least one other digital asset to a list of evidence identification values associated with the digital asset. Optionally, providing the determination comprises providing at least part of the list of evidence identification values. Providing at least part of a list of evidence values comprising one or more identification values identifying one or more digital assets increases confidence in an output of the system.

With reference to the first and second aspects, in an eighth possible implementation of the first and second aspects of the present invention at least one of the at least one iteration is executed while executing at least one other of the at least one iteration. Parallel execution of one or more iterations, that is executing at least one of the at least one iterations while executing at least one other of the at least one iteration improves throughput of the system.

With reference to the first and second aspects, in a ninth possible implementation of the first and second aspects of the present invention the at least one hardware processor is further adapted for retrieving the digital asset via at least one digital communication network interface connected thereto. Optionally, the at least one hardware processor is further adapted for retrieving the at least one other digital asset via the at least one digital communication network interface. Retrieving the digital asset and additionally or alternatively the at least one other digital asset via the at least one digital communication network interface increases usability of the system, allowing classification of an asset on a remote system. Optionally, the at least one hardware processor is further adapted for retrieving the at least one other digital asset from at least one non-volatile digital storage connected thereto.

With reference to the third aspect, in a first possible implementation of the third aspect of the present invention the at least one administrative task comprises at least one task selected from a group consisting of: declining to receive from the at least one other hardware processor at least one other digital asset; removing the digital asset from the at least one repository; and sending a message, generated using the determination, to at least one management hardware processor.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings.

DESCRIPTION OF SPECIFIC EMBODIMENTS OF THE INVENTION

Some embodiments described in the present disclosure relate to processing digital data and, more specifically, but not exclusively, to processing digital data for the purpose of identifying offensive digital data.

For brevity, henceforth the term "platform" is used to mean a digital-technology-based platform and the terms are used interchangeably.

Some platforms comprise a plurality of digital assets. A digital asset may be a digital file, some examples being a digital image file, a video file, an audio file, a text file, and a web page. Another example of a digital asset is a collection of files, for example a folder, and a collection of folders. Some other examples of a digital asset are an object extracted from another digital asset, for example an emoji or a location identifier, for example coordinates in a coordinate system, for example coordinates of a Global Positioning System (GPS).

Yet another example of a digital asset is a list of assets produce by inputting a search term into a search engine, for example a search engine for searching the Internet, some examples being Google, Bing and Yahoo!. An additional example of a digital asset is an indication of an occurrence in an interaction in a social media platform, also known as an action. Some examples of an action are removing a person from a group, uploading a video file, and another person leaving a group. A digital asset of a platform may be a file uploaded by a user of the platform, for example a file uploaded to a file sharing service. Other examples of a digital asset of a platform are one or more text files or text strings capturing at least part of a conversation in a chat group, and one or more action values indicative of one or more occurrences in an interaction on the platform between one and more users of the platform. A platform may store some of the one or more assets in one or more repositories. Some examples of a repository are one or more folders of a file system, a relational database, and a non-relational database, for example an object database, a document store and a key-value store.

Law enforcement agencies have a need to identify offensive content and offending social interactions in order to prevent and stop illegal activity and to identify offenders. To do so, a law enforcement agency may need to scan and classify one or more digital assets. The one or more digital assets may be assets of a platform. In some cases, a law enforcement has a need to scan and classify a platform.

In addition, an operator of a digital-technology-based platform may need to identify offensive content and additionally or alternatively offending social interactions on the platform. Some reasons that a digital-technology-based platform operator has for identifying offensive content and offending social interactions on the platform include compliance with laws and regulations governing operation of the platform, reducing risk of liability for offending one or more persons, and increasing and preserving the platform operator's business reputation. To identify offensive content and additionally or alternatively offending social interactions of the platform, the operator may need to scan and classify one or more digital assets of the platform. Some platforms have a need to classify one or more digital assets as they are introduced to the platform, for example by a user uploading the one or more digital assets or by a social interaction facilitated by the platform. Additionally, or alternatively, some platforms have a need to scan and classify the one or more digital assets at a time other than introduction of the one or more digital assets to the platform, for example a periodic scanning and classification of one or more digital assets of the platform.

There exist exhaustive methods for scanning and classifying a digital asset. In such exhaustive methods, a classification of the digital asset as offensive may be achieved without scanning the entire digital asset, however classification of the digital asset as non-offensive requires scanning the entire digital asset. For example, when the digital asset is a digital video, there exist methods for scanning the entire digital video to identify offensive content in the digital video, some examples being pornography, pedophilia, and violence. According to such methods, the digital video is classified non-offensive subject to no offensive content identified in the entire digital video. In another example, when the digital asset is a folder comprising a plurality of files, the folder is classified non-offensive subject to classifying each of the plurality of files as non-offensive. In an additional example, when the digital asset is a website, the website is classified as non-offensive subject to all static pages of the website, all dynamically generated pages of the website, and all links from pages of the website being classified as non-offensive.

Such exhaustive methods require a significant amount of time and a significant amount of computing resources. The amount of time required to scan an entire digital asset, for example an entire website, prohibits in some systems practical use of an exhaustive scanning and classification method to scan and classify the digital asset. Similarly, the amount of computing resources required to entirely scan a digital asset prevents in some other systems use of an exhaustive scanning and classification method to scan each digital asset added to the platform.

There exist statistical methods to reduce an amount of time and additionally or alternatively and amount if computing resources needed for scanning and classifying a digital asset. In such methods, a sample of the digital asset is scanned, and the digital asset is classified according to an outcome of scanning the sample. For example, to scan and classify a digital video an identified amount of digital frames may be extracted from the digital video and classified. In this example the digital video is classified according to an outcome of classifying the identified amount of digital frames. In another example, when the digital asset is a folder comprising a plurality of files, only some of the plurality of files is classified and the folder is classified according to an outcome of classifying the some of the plurality of files.

One known limitation of such statistical methods is a risk of a false negative classification. When the digital asset comprises offensive content not included in the sample, the sample may be classified as non-offensive and as a result the digital asset is classified as non-offensive. This classification is false, as the digital asset does comprise offensive content which was not scanned and classified. In addition, a classification of the sample may be inconclusive. The sample may not be classified as non-offensive while the sample is classified as offensive at a likelihood less than an identified threshold. In some systems when a classification of the sample as offensive is less than the identified threshold the digital asset is classified as non-offensive. There is a need to reduce a likelihood of a false negative classification of a digital asset as non-offensive.

One possible solution is increasing a size of the sample, however indiscriminately increasing the size of the sample increases processing time and increases an amount of computing resources needed, thus increasing cost of operation of a system.

The present disclosure proposes, in some embodiments described therein, increasing the size of the sample subject to an asset score computed for a digital asset being less than one or more threshold scores. In such embodiments, when one or more of a plurality of asset scores computed for the digital asset, each indicative of a degree of confidence that the digital asset has a respective offense classification, one or more digital asset identifiers are extracted from the digital asset and one or more other digital assets are retrieved according to at least one of the one or more digital asset identifiers.

For example, when the digital asset is a text file, the one or more digital asset identifiers may be one or more sentences extracted from the text file. In another example, when the digital asset is a digital video, the one or more digital asset identifiers may be one or more frame identifiers identifying one or more frames of a plurality of frames extracted from the digital video. In another example, when the digital asset is a website, the one or more digital asset identifiers may be one or more Universal Resource Location (URL) values extracted from a page of the website. Optionally, in some embodiments described herein, one or more other asset scores are computed for the one or more other digital assets and one or more of the one or more asset scores are updated according to a result of scanning and classifying the one or more other digital assets. When at least one of the updated one or more asset scores exceeds the one or more threshold scores, the digital asset is optionally determined to be offensive. This process is optionally repeated in more than one iteration, increasing an amount of assets processed when there is no conclusive classification.

Optionally, some of the one or more iterations increase a depth of scanning of the digital asset. For example, when the digital asset is a website, additional iterations optionally classify additional levels of the website further from a root page of the website than an initial part of the website scanned at an earlier iteration. When the digital asset is a text file, additional iterations optionally classify combinations of sentences extracted from the text file, where a first iteration optionally scans a single sentence extracted from the text file.

All of the one or more asset scores being less than the threshold score is an inconclusive classification of the digital asset. Executing more than one iteration subject to computing an inconclusive classification of the digital asset allows mitigating an amount of cases where the sample is increased in size. When an initial sample leads to a conclusive classification where at least one of the one or more asset scores exceeds the threshold score, according to some embodiments described in the present disclosure the is no need to increase the amount of digital assets in the sample, thus reducing an amount of time and additionally or alternatively an amount of computing time needed to classify the digital asset compared to other statistical methods. Increasing the amount of digital assets in the sample when classification of an initial sample is inconclusive increases accuracy of a classification of the digital asset compared to methods that use a fixed amount of digital assets in the sample.

In addition, according to some embodiments described in the present disclosure, the one or more asset scores are computed subject to a result of applying one or more quality assurance tests to the digital asset. Computing the one or more asset scores subject to the digital asset subject to a result of one or more quality assurance tests applied to the digital asset prevents trying to compute the one or more asset scores to an invalid digital asset, thus reducing an amount of resources required from a system implemented according to some embodiments of the present disclosure and thus reducing cost of operation of the system.

In addition, the present disclosure proposes in some embodiments described therein scanning and classifying one or more digital assets up to an identified level threshold. When each of the one or more digital asset identifiers is associated with a level value indicative of a location in a hierarchical relationship between the one or more digital identifiers, the at least one of the one or more digital asset identifiers may be selected subject to the respective level value of the at least one digital asset identifier being less than a level threshold. Limiting an amount of iterations according to hierarchical relationship between the one or more digital identifiers and the identified level threshold facilitates reducing an amount of resources required to compute the one or more asset scores compared to some exhaustive methods, while increasing accuracy of the one or more asset scores compared to some statistical methods.

Optionally, the one or more asset scores are computed according to a policy. For example, a policy may allow in a folder containing a plurality of digital images an identified amount of images containing nudity. However, when the folder contains an amount of digital images exceeding the identified amount of images, the policy may dictate classifying the folder as offensive. Optionally classifying the folder as offensive comprises increasing an asset score indicative of a likelihood of offensive content such that after the increase the asset score is above the threshold score. Optionally, a policy changes over time. Optionally, an asset score is computed for a digital asset according to a policy associated with an identified time. According to some embodiments, the one or more asset scores are not computed when there are one or more asset scores computed for the digital asset according to a recent policy, that is when an amount of time since the identified amount of time is less than a threshold time. Thus, the one or more asset scores are optionally computed subject to a failing to identify an identifier of the digital asset in a list of recently analyzed identifiers, analyzed according to a policy associated with a time preceding a current time by less than a threshold time.

Optionally, the one or more asset scores are computed using one or more classification models trained to compute in response to input comprising an input digital asset one or more offense classifications and one or more scores indicative of a degree of confidence the input digital asset has the one or more offense classifications. A non-limiting list of examples of a classification model includes a neural network and a Bayesian network.

Optionally, subject to determining the digital asset is offensive, some embodiments disclosed herein propose providing the determination to one or more software objects for the purpose of performing one or more administrative tasks. Examples of an administrative task include, but are not limited to, declining to receive one or more other digital assets, removing the digital asset from a repository, and sending a message, generated using the determination, to a management hardware processor. Another example of an administrative task is comparing the determination to the policy. It may be that a policy allows a digital asset to have one offensive classification while forbids having another offensive classification. For example, a platform may have a policy allowing images depicting nudity, but forbids images depicting children. Thus, a determination that nudity was detected may not require any additional action. Optionally, an administrative task includes adding the determination to a repository of determinations, for example a database containing determination indications.

Optionally, two or more other digital assets are analyzed in parallel, such that one or more other asset scores of one other digital asset are computed while computing one or more additionally other asset scores of an additionally other digital asset. Analyzing two or more other digital assets in parallel reduces an amount of time for scanning and classifying the digital asset, increasing throughput of a system implemented according to some embodiments described herein.

Optionally, one or more identification values identifying the one or more other digital assets are added to a list of evidence identification values associated with the digital asset. Optionally, when determining the digital asset is offensive, at least part of the list of evidence identification values is provided with the determination, optionally for the purpose of adding to a message generated according to the determination.

In some embodiments described in the present disclosure a system manages digital content. A system for managing content may be used for self-checking a platform, for example by a platform owner. A system for managing content may be used to classify another system, for example by a law enforcement agency.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
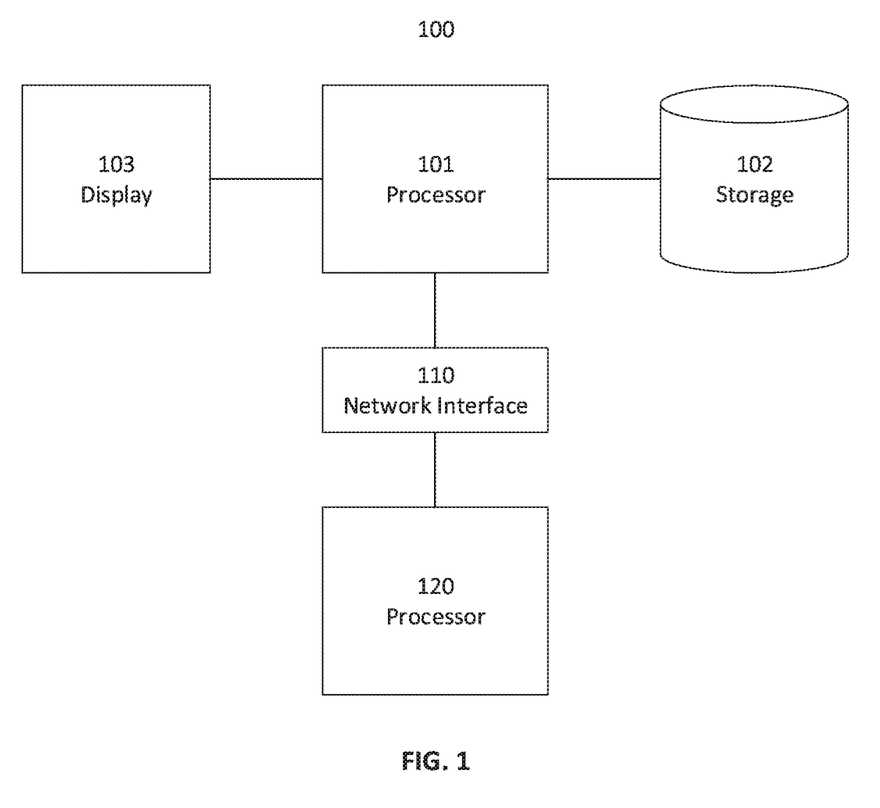
FIG. 1 is a schematic block diagram of an exemplary system for classifying a digital asset, according to some embodiments.

Reference is now made to FIG. 1, showing a schematic block diagram of an exemplary system 100 or classifying a digital asset, according to some embodiments. In such embodiments, at least one hardware processor 101 is connected to at least one digital communication network interface 110, optionally for the purpose of sending at least one other hardware processor 120 one or more messages generated using one or more determinations of one or more digital assets being offensive.

For brevity, henceforth the term "processing unit" is used to mean "at least one hardware processor" and the terms are used interchangeably. In addition, the term "network interface" is henceforth used to mean "at least one digital communication network interface" and the terms are used interchangeably.

Optionally, network interface 110 is connected to one or more digital communication networks. Optionally, at least one of the one or more digital communication networks is a local area network (LAN), for example an Ethernet LAN or a Wi-Fi LAN. Optionally, at least one other of the one or more digital communication networks is a wide area network (WAN), for example the Internet or a cellular network, for example a Global System for Mobile Communications (GSM) network.

Optionally, processing unit 101 is connected to one or more non-volatile digital storage 102, optionally for the purpose of storing and additionally retrieving one or more digital assets. Some examples of a non-volatile digital storage include a hard disk drive, a solid state drive, a network connected storage and a storage network. For brevity, henceforth the term "storage" is used to mean "one or more non-volatile digital storage" and the terms are used interchangeably. Optionally, storage 102 is electrically coupled with processing unit 101. Optionally, storage 102 is connected to processing unit 101 via network interface 110.

Optionally, processing unit 101 is connected to at least one display 103, optionally for the purpose of displaying one or more other messages generated using the one or more determinations.

To classify a digital asset, in some embodiments system 100 implements the following non-mandatory method.

Figure 2:
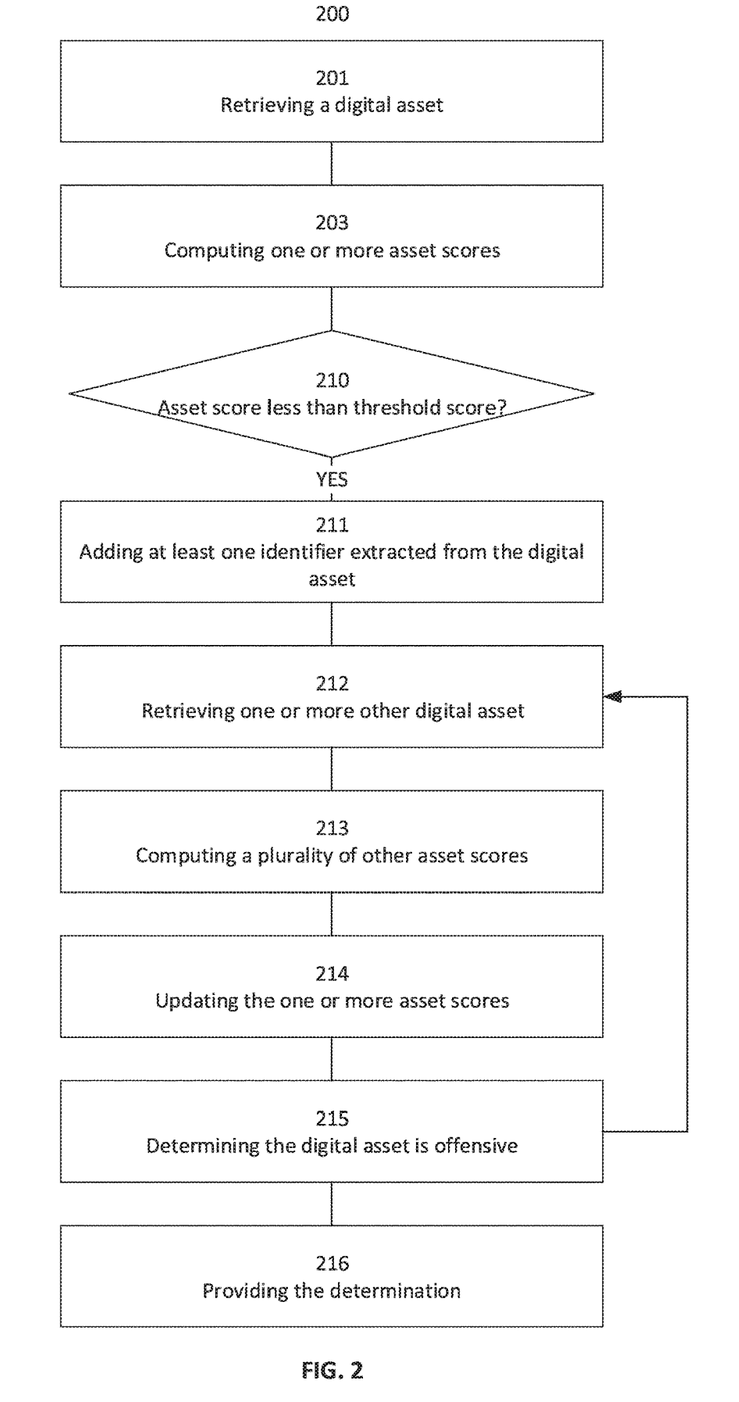
FIG. 2 is a flowchart schematically representing an optional flow of operations for classifying an asset using self-adaptive scanning, according to some embodiments.

Reference is now made also to FIG. 2, showing a flowchart schematically representing an optional flow of operations 200 for classifying an asset using self-adaptive scanning, according to some embodiments. In such embodiments, in 201 processing unit 101 retrieves a digital asset from one or more repositories. Optionally, processing unit 101 retrieves the digital asset according to an initial asset identifier. Some examples of an asset identifier are a Universal Resource Location (URL) value, a file name, and a folder name value. Optionally, an asset identifier is a search term value, for example when the digital asset is a result of executing a search.

Optionally, an asset identifier is an object identifier indicative of an object in another digital asset, some examples of an object identifier being an offset in a text when the other digital asset is an emoji extracted from a text, a frame identifier in a digital video, and an object identifier identifying an object extracted from a digital image, for example when one or more people are identified in a digital image and each of the one or more people are assigned an object identifier. Some examples of a repository are a database, a file folder, and a website. Optionally the one or more repositories are stored on storage 102. Optionally, processing unit 101 retrieves the digital asset via network interface 110. Optionally processing unit 101 stores the digital asset on storage 102. Some examples of a digital asset are: a text file, a search term value, a folder, a digital image, a digital video, a frame extracted from a digital video, a digital audio file, an audio fragment extracted from a digital audio file, a text, an emoji, a location value, an object extracted from a file, and an action value indicative of an occurrence in an interaction in social media. When the initial identifier is a URL the digital asset may be a text file. Optionally, the text file is a HyperText Markup Language (HTML) file. Optionally the text file is generated dynamically by one or more other processing units, for example other processing unit 120. Optionally, when the initial identifier is a search term value the digital asset comprises a plurality of URLs, optionally retrieved by providing the search term to at least one search engine, for example Google Search and Bing.

In 203, processing unit 101 optionally, computes one or more asset scores. Optionally, each of the one or more asset scores is indicative of a degree of confidence that the digital asset has a respective offense classification selected from a plurality of offense classifications. Some examples of an offense classification are: nudity, pedophilia, racism, bullying, shaming, self-harm, and sexual-offense. Optionally, computing the one or more asset scores is subject to a result of applying to the digital asset one or more quality assurance tests. For example, when the digital asset is a URL a non-limiting list of possible quality assurance tests includes: comparing the URL to a list of unwanted URLs, and applying a format test to the URL. In another example, when the digital asset is a digital image, another non-limiting list of other possible quality assurance tests includes: checking a format type of the digital image, converting a digital image to an identified format, for example Joint Photographic Experts Group (JPEG) format, comparing a size of the digital image to a minimal image file size, and checking an image is not too dark for a naked eye to see features of the image, for example by counting an amount of colors in the image. In yet another example, when the digital asset is a digital video, yet another non-limiting list of yet other possible quality assurance tests includes: checking a format of the digital video, and checking an integrity of the digital video according to an encoding scheme of the digital video. In an additional example, when the digital asset is a digital audio, an additional non-limiting list of additional possible quality assurance tests includes: checking a format of the digital audio, and separating the digital audio into a plurality of audio channels.

In 210, processing unit 101 optionally determines whether at least one of the one or more asset scores is greater than one or more threshold scores. Optionally the threshold score is a value between 0 and 1. Optionally, a threshold score is indicative of a low degree of confidence. Optionally, a threshold score is indicative of a medium degree of confidence. Optionally, a threshold score is indicative of a high degree of confidence.

Optionally subject to determining in 210 that none of the one or more asset scores are greater than the one or more threshold scores, in 211 processing unit 101 optionally adds one or more identifiers extracted from the digital asset of a list of identifiers. Optionally, the one or more identifiers are each an asset identifier as described above.

Optionally, in 212 processing unit 101 retrieves from the one or more repositories one or more other digital assets. Optionally, processing unit 101 retrieves the one or more other digital assets from storage 102. Optionally, processing unit 101 retrieves the one or more other assets according to one or more selected identifiers selected from the list of identifiers. Optionally, each of the list of identifiers is associated with a level value, indicative of a location in a hierarchical relationship between the list of identifiers. For example, when the list of identifiers comprises a list of URLs, a respective level value of a URL may be indicative of an amount of other URLs accessed starting with the initial identifier before adding the URL to the list of identifiers. In another example, when the list of identifiers comprises a list of frame identifiers of a video, a respective level value of a frame identifier may be indicative of an amount of search iterations executed before adding the frame identifier to the list of identifiers. Optionally, the one or more selected identifiers are selected subject to the respective level values thereof being less than a level threshold. For example, a level threshold may be equal 5, thus no more than 5 levels in a hierarchy of identifiers will be processed.

Optionally, the level threshold is an integer less than 10. Optionally, the level threshold is an integer equal to or greater than 10. Optionally, the level threshold is configurable in a policy.

Optionally, the level threshold is configurable while executing method 200. Optionally, the one or more identifiers extracted from the digital asset are added to the list of identifiers according to one or more scope values. For example, when a scope value is "all", all identifiers extracted from the digital asset are added to the list of identifiers. When the score value is "random", optionally an identified percentage of identifiers are selected at random from the identifiers extracted from the digital asset and added to the list of identifiers. In another example, when the score value is "every", a subset of identifiers are selected in order from the identifiers extracted from the digital asset and added to the list of identifiers, where the subset of identifiers are selected by selecting an initial identifier and repeatedly selecting a next identifier by skipping an identified amount of skipped identifiers starting with an already selected identifier. Optionally, the identified percentage of identifiers and the identified amount of skipped identifiers is configurable in the policy.

Optionally, the one or more selected identifiers are selected from the list of identifiers subject to failing to identify the one or more selected identifiers in a list of recently analyzed identifiers, analyzed according to a recent policy. Optionally each of the list of analyzed identifiers is associated with a time indicative of a time of analyzing a historical digital asset retrieved according to the analyzed identifier. Optionally, retrieving the one or more other digital assets comprises extracting the one or more other digital assets from the digital asset according to the one or more selected identifiers. For example, when the digital asset is a digital video, the one or more selected identifiers may be one or more frame identifiers in a plurality of frames of the digital video and retrieving the one or more other digital assets optionally comprises extracting one or more frames from the digital asset according to the one or more frame identifiers. Other examples of another asset extracted from the digital asset include a URL extracted from a text file, for example from a web page or a text document, a URL extracted from a list of URLs, one or more sentences extracted from a text file, a button extracted from a web page, a URL extracted from a button, a tab extracted from a web page, and comment text extracted from metadata associated with yet another asset.

When the digital asset is a folder, the one or more identifiers extracted from the digital asset are optionally indicative of a list of files in the folder, for example when the folder is an ensemble of a plurality of standalone files such that an asset score of the folder is according to one or more file asset scores of the plurality of standalone files.

When the digital asset is a text, the one or more identifiers optionally comprise a list of sentences extracted from the text.

Optionally, processing unit 101 associates the digital asset with at least one further other digital asset, for example when the digital asset is an action value or a location value, optionally for the purpose of intensifying a classification of the at least one further other digital asset. For example, a location value may be used to intensify a classification of the at least one other digital asset as being associated with a sexual predator. In another example, an action value may be used to intensify a classification of the at least one other digital asset as being associated with bullying or shaming.

Optionally, when the digital asset is an emoji, processing unit 101 converts the emoji into a corresponding text.

When the digital asset is a video file the one or more identifiers comprise a list of frames extracted from the video file, and the one or more selected identifiers are selected from the list of identifiers according to a search algorithm applied to the list of frames.

Figure 3:
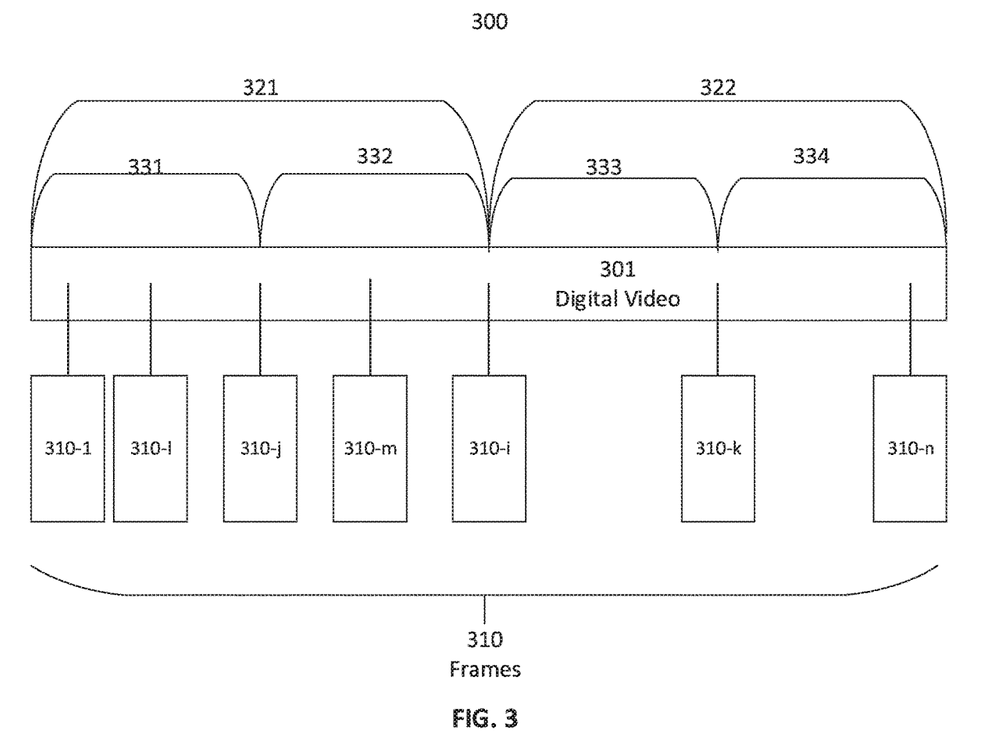
FIG. 3 is a schematic block diagram of an exemplary digital video, according to some embodiments.

Reference is now made also to FIG. 3, showing a schematic block diagram 300 of an exemplary digital video, according to some embodiments. In such embodiments, digital video 301 comprises a plurality of frames 310, comprising frame 310-$l$ through frame 310-$n$ including frame 310-$i$, frame 310-$j$, frame 310-$k$, frame 310-$l$ and frame 310-$m$, where n denotes an amount of frames in plurality of frames 310, and i, j, k, l, and m each denote a sequence identifier of one of plurality of frames 310 such that $1 < i, j, k, l, m < n$.

Optionally, in 211 processing unit 101 adds to the list of identifiers a plurality of frame identifiers, each identifying one of plurality of frames 310. When the search algorithm applied to the list of frames is a binary search applied using a plurality of offsets in the video file, each of one of plurality of frames 310, in a first iteration of a plurality of iterations processing unit 101 optionally divides digital video 301 into two segments, segment 321 and 322, and selects an identifier of frame 310-*i* from the list of identifiers. In another of the plurality of iterations, after processing frame 310-*i*, processing unit optionally divides each of segments 321 and 322 into segments 331 and 332, and segment 333 and 334 respectively. Optionally, processing unit then selects another frame identifier identifying frame 310-*j* from segment 332, and additionally or alternatively yet another frame identifier identifying frame 310-*k* from segment 334.

Reference is now made again to FIG. 2.

When the digital asset is a digital audio file, when the digital audio file is longer than a threshold audio length, the one or more identifiers optionally comprise a list of fragments extracted from the digital audio. Optionally, the list of fragments comprises a plurality of fragments identified such that each fragment of the plurality of fragments overlaps part of at least one other fragment of the plurality of fragments. Optionally, each of the plurality of fragments has a beginning and an end in accordance with a temporal location of the respective fragment in the digital audio file.

Figure 4:
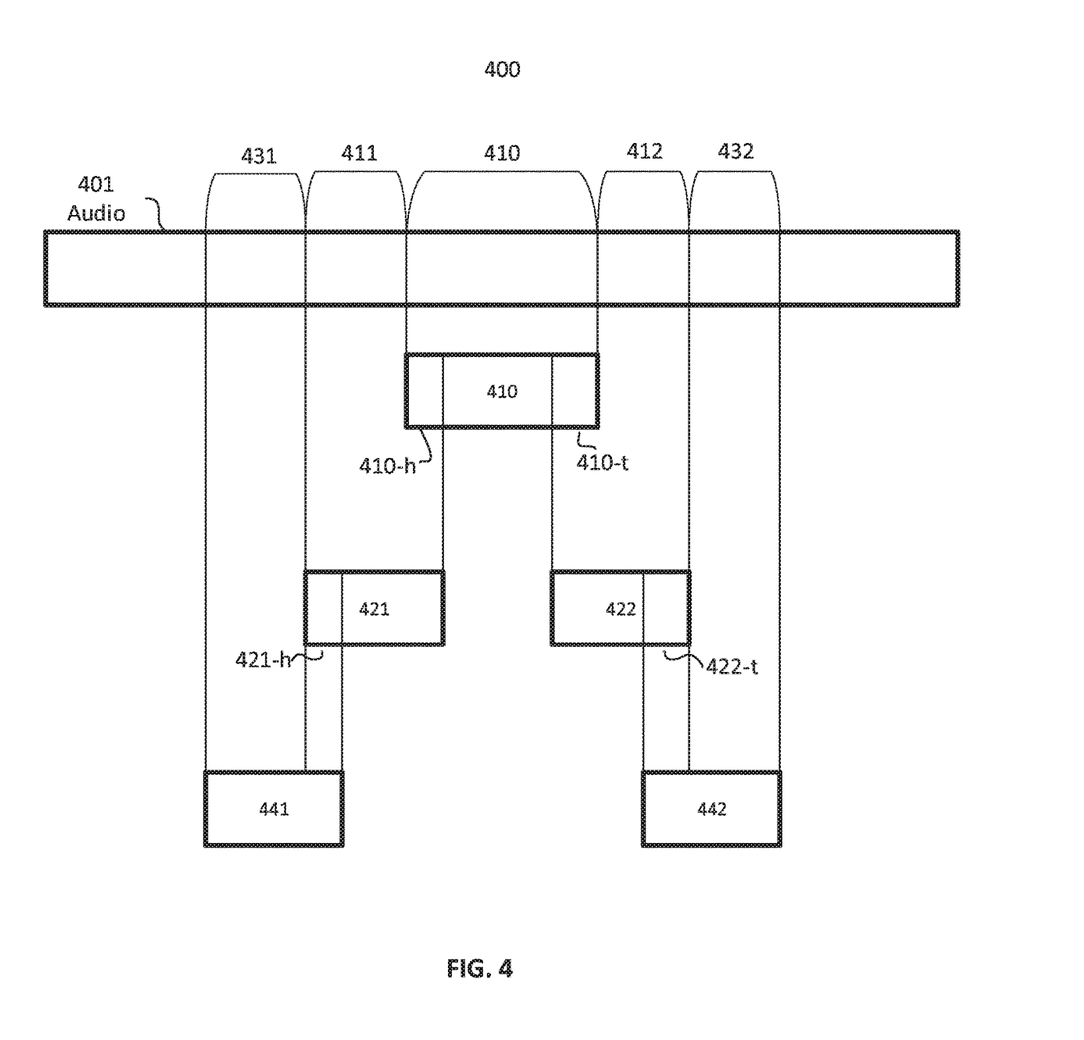
FIG. 4 is a schematic block diagram of an exemplary digital audio asset, according to some embodiments.

Reference is now made also to FIG. 4, showing a schematic block diagram 400 of an exemplary digital audio asset, according to some embodiments. In such embodiments, processing unit 101 optionally identifies in digital audio asset 401 first fragment 410, optionally in the middle of digital audio asset 401. Optionally, processing unit 101 extracts first fragment 410 from digital audio 401 and adds first fragment 410 to the list of fragments. Optionally, first fragment 410 is associated with overlapping in two directions—overlap head and overlap tail. Optionally, processing unit 101 extracts from digital audio asset 401 preceding fragment 411 and following fragment 412 immediately preceding first fragment 410 and immediately following first fragment 410, respectively. Optionally, processing unit 101 produces a new fragment 421 by appending preceding fragment 411 to a beginning of fragment part 410-*h* from the beginning of fragment 410. Optionally, processing unit 101 produces another new fragment 422 by appending following fragment 412 to an end of fragment part 410-*t* from the end of first fragment 410. Optionally, new fragment 421 is associated with overlap direction overlap head. Optionally, other new fragment 422 is associated with overlap direction overlap tail. Optionally, processing unit 101 adds new fragment 421 and other new fragment 421 to the list of fragments. Optionally, processing unit 101 identifies additional fragments by repeating the above process for one or more other fragments selected from the list of fragments. Thus, similarly, selecting fragment 421 allows processing unit 101 to identify and optionally extract fragment 441 by appending other preceding fragment 431 to the beginning of fragment part 421-*h* from the beginning of fragment 421. Optionally, selecting fragment 422 allows processing unit 101 to identify an optionally extract fragment 442 by appending other following fragment 432 to the end of fragment part 421-*t* from the end of fragment 421.

Reference is now made again to FIG. 2.

Optionally, in 213 processing unit 101 computes a plurality of other asset scores. Optionally, each of the plurality of other asset scores is associated with one other digital asset of the one or more other digital assets, and is indicative of another degree of confidence that the other digital asset has another respective offense classification. Optionally, computing the plurality of other asset scores is subject to another result of applying to the one or more other digital assets one or more other quality assurance tests.

Optionally, computing the one or more asset scores comprises executing one or more classification models. Some examples of a classification model are a neural network, a decision tree, a K-means model, a Bayesian network, and a support vector machine (SVM). Optionally, the one or more classification models are each trained to compute, in response to an input digital asset, one or more offense classifications and one or more scores indicative of a degree of confidence has the one or more offense classification.

In 214, processing unit 101 optionally updates the one or more asset scores according to the plurality of other asset scores and one or more policies. Thus, the one or more asset scores of the digital asset are updated according to the one or more other digital assets, associated with one or more other levels in the hierarchy of identifiers. For example, the one or more digital assets may include one or more location values. In another example, the one or more digital assets include one or more action values. Optionally the one or more policies comprise the policy comprising the level threshold, the identified percentage of identifiers, and the identified amount of skipped identifiers. Optionally, updating the one or more asset scores comprises executing at least one other classification model. Optionally, the at least one other classification model is trained to compute one or more additional scores indicative of a degree of confidence that an input digital asset has at least one offense classification, where the one or more additional scores are computed in response to input comprising one or more input digital assets comprising the input digital asset and a plurality of input asset scores of the input digital asset.

In 215, processing unit 101 optionally determines the digital asset is offensive subject to at least one of the one or more asset scores exceeding the one or more threshold scores. Otherwise, processing unit optionally adds to the list of identifiers one or more other identifiers extracted from the one or more other digital assets, thus adding another level to the hierarchy of the list of identifiers. Optionally, processing unit 101 adds the one or more identification value identifying the one or more other digital assets to a list of evidence identification values associated with the digital asset.

Optionally, 212, 213, 214, and 215 are repeated in each of one or more iterations. Optionally, at least one of the one or more iterations is executed while executing at least one other of the one or more iterations, i.e. at least two of the at least one other digital asset are processed in parallel.

In 216, subject to determining in 215 the digital asset is offensive, processing unit 101 optionally provides the determination to one or more software objects for the purpose of performing one or more administrative tasks. Optionally, providing the determination comprises providing the list of evidence identification values. Optionally, the one or more software objects are executed by processing unit 101. Optionally performing the one or more administrative tasks comprises sending via network interface 110, optionally to other processing unit 120, one or more messages generated using the one or more determination. Optionally the one or more administrative tasks comprise comparing the determination to the one or more policies.

In some embodiments a system manages digital content.

Figure 5:
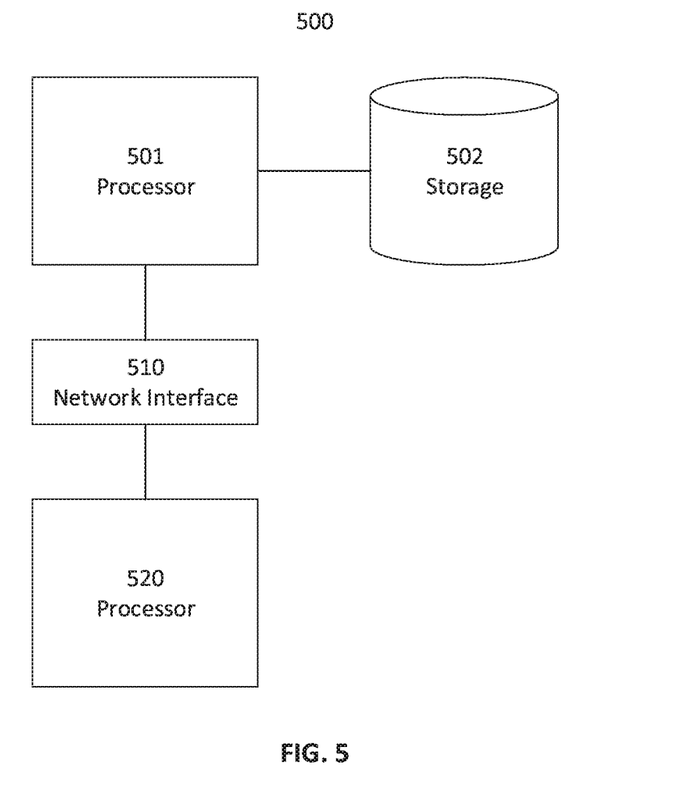
FIG. 5 is a schematic block diagram of an exemplary system for managing digital content, according to some embodiments.

Reference is now made also to FIG. 5, showing a schematic block diagram of an exemplary system 500 for managing digital content, according to some embodiments. In such embodiments, processing unit 501 is connected to network interface 510, optionally for the purpose of receiving from other processing unit 520 one or more digital assets. Optionally, other processing unit 520 is a client of a service provided by system 500.

Optionally, network interface 510 is connected to one or more other digital communication networks. Optionally, at least one of the one or more other digital communication networks is a local area network (LAN), for example an Ethernet LAN or a Wi-Fi LAN. Optionally, at least one other of the one or more other digital communication networks is a wide area network (WAN), for example the Internet or a cellular network, for example a Global System for Mobile Communications (GSM) network.

Optionally, processing unit 501 is connected to storage 502, optionally for the purpose of storing and additionally retrieving one or more digital assets. Optionally, storage 502 is electrically coupled with processing unit 501. Optionally, storage 502 is connected to processing unit 501 via network interface 510.

To manage digital content, in some embodiments system 500 implements the following optional method.

Figure 6:
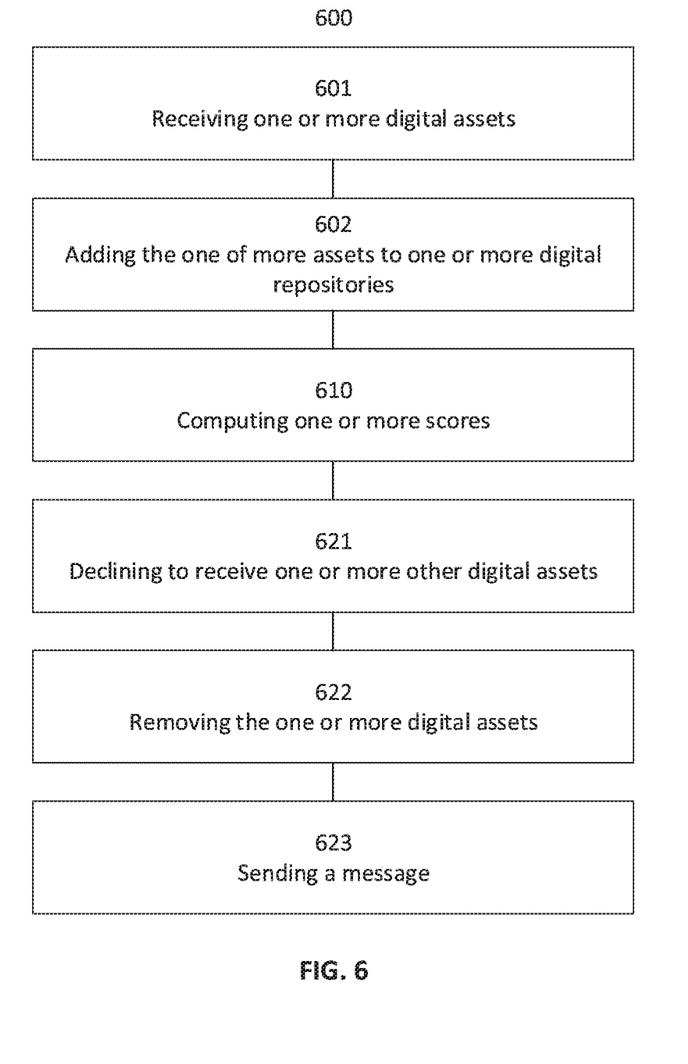
FIG. 6 is a flowchart schematically representing an optional flow of operations for managing digital content using self-adaptive scanning, according to some embodiments.

Reference is now made also to FIG. 6, showing a flowchart schematically representing an optional flow of operations 600 for managing digital content using self-adaptive scanning, according to some embodiments. In such embodiments, processing unit 501 executes a plurality of iterations. In each of the plurality of iterations, in 601 processing unit 501 optionally receives a digital asset from other processing unit 520. In 602, processing unit 501 optionally adds the digital asset to one or more digital repository, optionally stored on storage 502. Optionally, in 610 processing unit 501 computes one or more scores for the digital asset, optionally using method 200.

Subject to determining in 610 that the digital asset is offensive, in 621 processing unit 501 optionally declines receiving from other processing unit 520 one or more other digital assets, for example to block an offending client. Optionally, subject to determining in 610 that the digital asset is offensive, in 622 processing unit 501 removes the digital asset form the one or more repository, and in 623 processing unit 501 optionally sends one or more management processing units a message generated using the determination. Optionally, processing unit 501 sends the message via network interface 510.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant digital assets and asset scores will be developed and the scope of the terms "digital asset" and "asset score" are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to embodiments. To the extent that section headings are used, they should not be construed as necessarily limiting. In addition, any priority document(s) of this application is/are hereby incorporated herein by reference in its/their entirety.

What is claimed is:

1. A method for classifying a digital asset, comprising:
retrieving from at least one repository, according to an initial identifier, a digital asset;
computing at least one asset score, each indicative of a degree of confidence that the digital asset has a respective offense classification selected from a plurality of offense classifications;
subject to the at least one asset score being less than at least one threshold score:
adding to a list of identifiers at least one identifier extracted from the digital asset; and
in each of at least one iteration:
retrieving from the at least one repository at least one other digital asset, according to at least one selected identifier selected from the list of identifiers;
computing a plurality of other asset scores, each associated with one other digital asset of the at least one other digital asset and indicative of another degree of confidence that the at least one other digital asset has another respective offense classification;
updating the at least one asset score according to the plurality of other asset scores and at least one policy; and
determining the digital asset is offensive subject to at least one of the at least one asset score exceeding the at least one threshold score, otherwise adding to the list of identifiers at least one other identifier extracted from the at least one other digital asset; and
subject to determining the digital asset is offensive, providing the determination to at least one software object for the purpose of performing at least one administrative task.

2. The method of claim 1, wherein the initial identifier is selected from a group of asset identifiers consisting of: a Universal Resource Location (URL) value, a search term value, a file name value, a folder name value, a file offset value, and an object identifier indicative of an object in a digital asset; and
wherein the at least one identifier is selected from the group of asset identifiers.

3. The method of claim 1, wherein the digital asset is selected from a group of asset identifiers consisting of: a text file, a search term value, a folder, a digital image, a digital video, a frame extracted from a digital video, a digital audio file, an audio fragment extracted from a digital audio file, a text, an emoji, a location value, an object extracted from a file, and an action value indicative of an occurrence in an interaction in social media.

4. The method of claim 1, wherein retrieving the at least one other digital asset comprises extracting the at least one other digital asset from the digital asset according to the at least one selected identifier.

5. The method of claim 1, wherein computing the at least one asset score is subject to a result of applying to the digital asset at least one quality-assurance test; and
wherein computing the plurality of other asset scores is subject to another result of applying to the at least one other digital asset at least one other quality assurance test.

6. The method of claim 1, wherein each of the list of identifiers is associated with a level value, indicative of a location in a hierarchical relationship between the list of identifiers; and
wherein the at least one selected identifier is selected from the list of identifiers subject to the respective level value of the at least one selected identifier being less than a level threshold.

7. The method of claim 1, wherein the at least one selected identifier is selected from the list of identifiers subject to failing to identify the at least one selected identifier in a list of recently analyzed identifiers, analyzed according to a recent policy.

8. The method of claim 1, wherein computing the at least one score comprises executing at least one classification model, trained to compute, in response to input comprising an input digital asset, at least one offense classification and at least one score indicative of a degree of confidence the input digital asset has the at least one offense classification.

9. The method of claim 1, wherein updating the at least one asset score comprises executing at least one other classification model, trained to compute, in response to input comprising at least one input digital asset and a plurality of input asset scores of an input digital asset, at least one additional score indicative of a degree of confidence the input digital asset has at least one offense classification.

10. The method of claim 1, wherein the at least one administrative task comprises comparing the determination to the at least one policy.

11. The method of claim 1, further comprising adding at least one identification value identifying the at least one other digital asset to a list of evidence identification values associated with the digital asset; and
wherein providing the determination comprises providing at least part of the list of evidence identification values.

12. The method of claim 1, wherein the at least one identifier extracted from the digital asset are added to the list of identifiers according to at least one scope value.

13. The method of claim 12, wherein at least one of the at least one scope value is selected from a group consisting of: all, random, and every.

14. The method of claim 3, wherein when the digital asset is a video file:
the at least one identifier comprises a list of frames extracted from the video file; and
the at least one selected identifier is selected from the list of identifiers according to a search algorithm applied to the list of frames.

15. The method of claim 14, wherein the search algorithm is a binary search algorithm applied using a plurality of offsets in the video file, each of one of the list of frames extracted from the video file.

16. The method of claim 3, further comprising:
when the digital asset is an emoji, converting the emoji into a corresponding text.

17. The method of claim 3, wherein when the initial identifier is a search term value the digital asset comprises a plurality of URLs.

18. The method of claim 17, wherein retrieving the digital asset from the at least one repository according to the initial identifier comprises providing the search term to at least one search engine.

19. The method of claim 3, wherein when the digital asset is a folder, the at least one identifier is indicative of a list of files in the folder.

20. The method of claim 3, wherein when the digital asset is a digital audio file:
the at least one identifier comprises a list of fragments extracted from the digital audio file.

21. The method of claim 20, wherein the list of fragments comprises a plurality of fragments, each having a beginning and an end in accordance with a temporal location of the respective fragment in the digital audio file;
wherein the plurality of fragments are identified by:
adding to the list of fragments a first fragment extracted from the digital audio file, associated with at least one overlap direction comprising overlap head and overlap tail; and
in each of a plurality of extraction iterations:
selecting a fragment from the list of fragments;
extracting from the digital audio file an extension fragment such that the fragment and extension fragment are contiguous in the digital audio file according to an overlap direction of the at least one overlap direction associated thereto;
appending the extension fragment to a part of the fragment, selected according to the overlap direction, to produce a new fragment;
associating the new fragment with the overlap direction; and
adding the new fragment to the list of fragments; and
wherein
when the overlap direction is overlap tail:
the part of the fragment is from the end of the fragment; and
the extension fragment immediately follows the fragment in the digital audio file; and
when the overlap direction is overlap head:
the part of the fragment is from the beginning of the fragment; and
the extension fragment immediately precedes the fragment in the digital audio file.

22. The method of claim 3, wherein when the digital asset is a text:
the at least one identifier comprises a list of sentences extracted from the text.

23. The method of claim 3, further comprising when the digital asset is an action value or a location value associating the digital asset with at least one other digital asset.

24. The method of claim 1, wherein at least one of the at least one iteration is executed while executing at least one other of the at least one iteration.

25. A system for classifying a digital asset, comprising at least one hardware processor adapted for:
retrieving from at least one repository, according to an initial identifier, a digital asset;
computing at least one asset score, each indicative of a degree of confidence that the digital asset has a respective offense classification selected from a plurality of offense classifications;
subject to the at least one asset score being less than at least one threshold score:
adding to a list of identifiers at least one identifier extracted from the digital asset; and
in each of at least one iteration:
retrieving from the at least one repository at least one other digital asset, according to at least one selected identifier selected from the list of identifiers;
computing a plurality of other asset scores, each associated with one other digital asset of the at least one other digital asset and indicative of another degree of confidence that the at least one other digital asset has another respective offense classification;
updating the at least one asset score according to the plurality of other asset scores and at least one policy; and
determining the digital asset is offensive subject to at least one of the at least one asset score exceeding the at least one threshold score, otherwise adding to the list of identifiers at least one other identifier extracted from the at least one other digital asset; and
subject to determining the digital asset is offensive, providing the determination to at least one software object for the purpose of performing at least one administrative task.

26. The system of claim 25, wherein the at least one hardware processor is further adapted for retrieving the digital asset via at least one digital communication network interface connected thereto; and
wherein the at least one hardware processor is further adapted for retrieving the at least one other digital asset via the at least one digital communication network interface.

27. The system of claim 25, wherein the at least one hardware processor is further adapted for retrieving the at least one other digital asset from at least one non-volatile digital storage connected thereto.

28. A system for managing digital content, comprising at least one hardware processor adapter for, in each of a plurality of iterations:
receiving a digital asset from at least one other hardware processor;
adding the digital asset to at least one digital repository;
computing at least one score for the digital asset, by:
retrieving the digital asset from the at least one repository, according to an initial identifier;
computing the at least one asset score, each indicative of a degree of confidence that the digital asset has a respective offense classification selected from a plurality of offense classifications; and
subject to the at least one asset score being less than at least one threshold score:
adding to a list of identifiers at least one identifier extracted from the digital asset; and
in each of at least one iteration:
retrieving from the at least one repository at least one other digital asset, according to at least one selected identifier selected from the list of identifiers;
computing a plurality of other asset scores, each associated with one other digital asset of the at least one other digital asset and indicative of another degree of confidence that the at least one other digital asset has another respective offense classification;
updating the at least one asset score according to the plurality of other asset scores and at least one policy; and
determining the digital asset is offensive subject to at least one of the at least one asset score exceeding the at least one threshold score, otherwise adding to the list of identifiers at least one other identifier extracted from the at least one other digital asset; and subject to determining the digital asset is offensive, providing the determination to at least one software object for the purpose of performing at least one administrative task.

29. The system of claim 28, wherein the at least one administrative task comprises at least one task selected from a group consisting of:
   declining to receive from the at least one other hardware processor at least one other digital asset;
   removing the digital asset from the at least one repository; and
   sending a message, generated using the determination, to at least one management hardware processor.

\* \* \* \* \*